US012698374B2

(12) United States Patent (10) Patent No.: US 12,698,374 B2

Hayashi (45) **Date of Patent: \*Aug. 4, 2026**

(54) POLYAMIDE-BASED RESIN EXPANDED BEADS, MOLDED ARTICLE OF POLYAMIDE-BASED RESIN EXPANDED BEADS, AND METHOD FOR PRODUCING POLYAMIDE-BASED RESIN EXPANDED BEADS

(71) Applicant: JSP CORPORATION, Tokyo (JP)

(72) Inventor: Tatsuya Hayashi, Yokkaichi (JP)

(73) Assignee: JSP CORPORATION, Tokyo (JP)

( * ) Notice: Subject to any disclaimer, the term of this patent is extended or adjusted under 35 U.S.C. 154(b) by 957 days.

This patent is subject to a terminal disclaimer.

(21) Appl. No.: 17/794,760

(22) PCT Filed: Feb. 1, 2021

(86) PCT No.: PCT/JP2021/003604

§ 371 (c)(1),
(2) Date: Jul. 22, 2022

(87) PCT Pub. No.: WO2021/166623

PCT Pub. Date: Aug. 26, 2021

(65) Prior Publication Data

US 2023/0053755 A1 Feb. 23, 2023

(30) Foreign Application Priority Data

Feb. 18, 2020 (JP) ................................. 2020-025728

(51) Int. Cl.
C08J 9/16 (2006.01)
C08J 9/18 (2006.01)
C08J 9/22 (2006.01)

(52) U.S. Cl.
CPC . C08J 9/16 (2013.01); C08J 9/18 (2013.01);
C08J 9/22 (2013.01); *C08J 2377/06* (2013.01)

(58) Field of Classification Search
CPC ........................................................... C08J 9/16
See application file for complete search history.

(56) References Cited

U.S. PATENT DOCUMENTS

| | | | | | |
|---|---|---|---|---|---|
| 3,770,663 | A | * | 11/1973 | Shiro | C08J 9/18 |
| | | | | | 521/134 |
| 4,704,239 | A | * | 11/1987 | Yoshimura | C08J 9/122 |
| | | | | | 264/DIG. 13 |

| | | | | | |
|---|---|---|---|---|---|
| 12,129,350 | B2 | * | 10/2024 | Hayashi | C08J 9/224 |
| 12,234,338 | B2 | * | 2/2025 | Keppeler | C08G 69/40 |
| 2002/0143076 | A1 | * | 10/2002 | Kiguchi | C08J 9/18 |
| | | | | | 521/58 |
| 2018/0044497 | A1 | * | 2/2018 | Kondo | C08J 9/18 |
| 2021/0189089 | A1 | | 6/2021 | Hayashi et al. | |

FOREIGN PATENT DOCUMENTS

| | | | |
|---|---|---|---|
| CN | 107250233 | A | 10/2017 |
| JP | S61-268737 | A | 11/1986 |
| JP | 2017-066279 | A | 4/2017 |
| JP | 2018-043490 | A | 3/2018 |
| WO | 2020/050301 | A1 | 3/2020 |

OTHER PUBLICATIONS

WO2017-220671 (Year: 2017).*
UBE Nylon 1022B flyer (Year: 2014).*
Yeh, S. et al., "Carbon Dioxide-Blown Expanded Polyamide Bead Foams with Bimodal Cell Structure," Ind. Eng. Chem. Res., 2019, vol. 58, No. 8, pp. 2958-2969.
Feb. 12, 2024 extended Search Report issued in European Patent Application No. 21757785.7.
Feb. 14, 2023 Office Action issued in Chinese Patent Application No. 202180015452.5.
Apr. 6, 2021 International Search Report issued in Patent Application No. PCT/JP2021/003604.
Apr. 6, 2021 Written Opinion of the International Searching Authority issued in Patent Application No. PCT/JP2021/003604.

\* cited by examiner

*Primary Examiner* — Irina Krylova
(74) *Attorney, Agent, or Firm* — Oliff PLC

(57) ABSTRACT

Polyamide-based resin expanded beads contain a polyamide-based resin as a base material resin. The beads have a crystal structure, an intrinsic peak of the polyamide-based resin and a high-temperature peak having a peak top temperature on a higher temperature side than a peak top temperature of the intrinsic peak appear in a DSC curve obtained under a predetermined condition; an amount of heat of fusion of the high-temperature peak is within 5 J/g or more and 50 J/g or less; and a coefficient of variation of the amount of heat of fusion of the high-temperature peak is 20% or less. The beads are produced by in-mold molding. A method for producing the beads includes: impregnating a polyamide-based resin; and releasing expandable polyamide-based resin beads from a sealed container, a temperature in the sealed container is raised at a rate of 0.3° C. or higher and 1.5° C. or lower per 10 minutes.

6 Claims, 1 Drawing Sheet

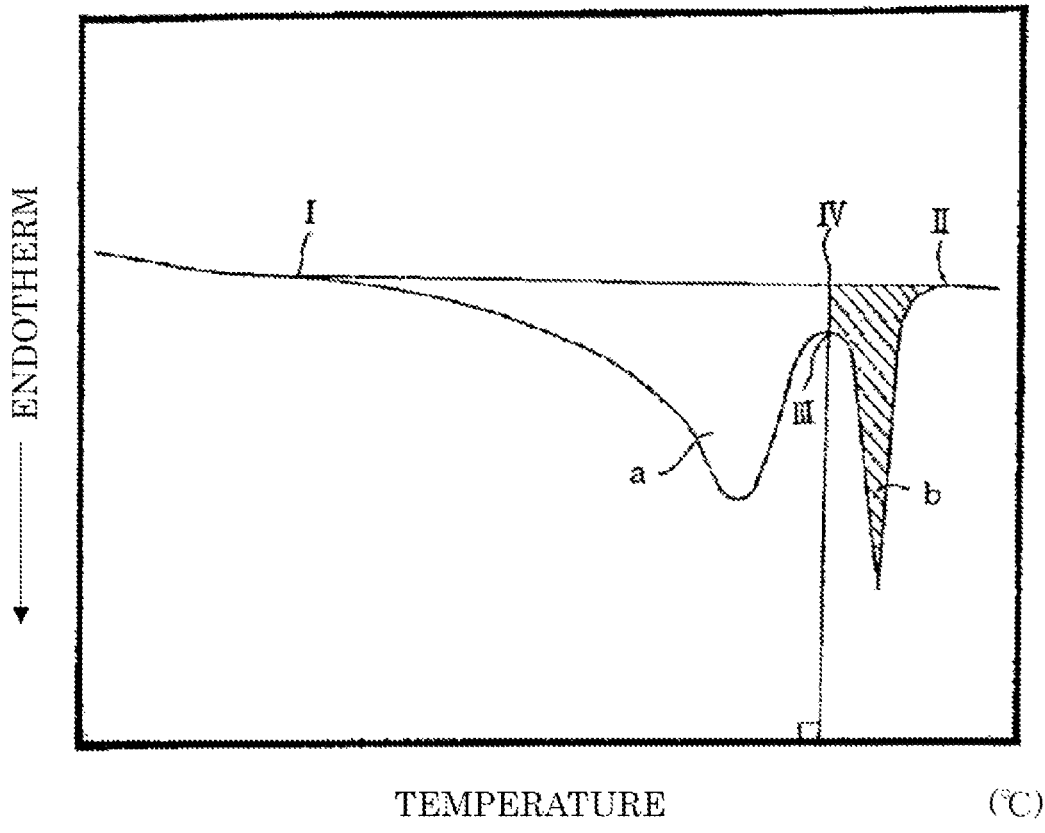

POLYAMIDE-BASED RESIN EXPANDED BEADS, MOLDED ARTICLE OF POLYAMIDE-BASED RESIN EXPANDED BEADS, AND METHOD FOR PRODUCING POLYAMIDE-BASED RESIN EXPANDED BEADS

TECHNICAL FIELD

The present invention relates to polyamide-based resin expanded beads, a molded article of polyamide-based resin expanded beads, and a method for producing polyamide-based resin expanded beads.

BACKGROUND ART

Materials applied to vehicle parts are required to have high strength and high toughness and the like. From the viewpoint of reducing fuel costs, the materials applied to vehicle parts are also required to be lightweight. In order to meet such demands, alternatives from metals to resin materials have been studied for the materials applied to vehicle parts. Polyamide-based resins are known as resins having high heat resistance and excellent in abrasion resistance and chemical resistance and the like among general resin materials. An expanded molded article obtained by expanding the polyamide-based resin can be further reduced in weight while holding excellent properties. For this reason, the polyamide-based resin expanded molded article is expected to be developed in applications such as automobile parts.

For example, Patent Literature 1 proposes the invention of polyamide-based pre-expanded beads (hereinafter, also referred to as conventional beads 1). The document describes a method for obtaining the conventional beads 1. Specifically, first, polyamide-based resin beads, a volatile expanding agent, and a dispersion medium such as water are charged into a sealed container. Next, one end of the sealed container is released while a temperature in the sealed container is held in a temperature range between a temperature lower by 50° C. than the melting point of the poly-amide-based resin beads and a temperature higher by 50° C. than the melting point. The polyamide-based resin beads containing the expanding agent are taken out under a low pressure atmosphere and expanded to obtain the conventional beads 1.

CITATION LIST

Patent Literature

Patent Literature 1: JP 61-268737 A

SUMMARY OF INVENTION

Technical Problem

However, it has been found that the polyamide-based pre-expanded resin beads obtained by the method described in Patent Literature 1 have insufficient moldability.

The present invention has been made in view of the above background, and relates to provision of polyamide-based resin expanded beads having more excellent moldability than in the past, a molded article of polyamide-based resin expanded beads molded using the polyamide-based resin expanded beads, and a method for producing the polyamide-based resin expanded beads.

Solution to Problem

Polyamide-based resin expanded beads of the present invention are polyamide-based resin expanded beads containing a polyamide-based resin as a base material resin, wherein: the expanded beads have a crystal structure in which a melting peak (intrinsic peak) intrinsic to the poly-amide-based resin and a melting peak (high-temperature peak) having a peak top temperature on a higher temperature side than a peak top temperature of the intrinsic peak appear in a DSC curve obtained under the following condition 1, an amount of heat of fusion of the high-temperature peak is within a range of 5 J/g or more and 50 J/g or less, and a coefficient of variation of the amount of heat of fusion of the high-temperature peak is 20% or less:

(Condition 1)

On the basis of heat-flux differential scanning calorimetry of JIS K7122-1987, the polyamide-based resin expanded beads are used as test pieces, and heated and melted at a heating rate of 10° C./min from 30° C. to a temperature higher by 30° C. than that at the end of the melting peak to obtain the DSC curve.

A molded article of polyamide-based resin expanded beads of the present invention is obtained by in-mold molding of the polyamide-based resin expanded beads of the present invention.

A method for producing the polyamide-based resin expanded beads of the present invention includes a dispersion step of dispersing polyamide-based resin beads in an aqueous dispersion medium in a sealed container; an expanding agent applying step of adding an expanding agent to the polyamide-based resin beads; a crystallization treatment step of heating the polyamide-based resin beads dispersed in the aqueous dispersion medium to form a high-temperature peak; and an expanding step of releasing the polyamide-based resin beads containing the expanding agent together with the aqueous dispersion medium from the sealed container under a pressure lower than a pressure in the sealed container to expand the polyamide-based resin beads, in which in the expanding step, when the polyamide-based resin beads containing the expanding agent are released from the sealed container, a temperature rise adjustment that raises the temperature in the sealed container at a rate of 0.3° C. or higher and 1.5° C. or lower per 10 minutes is performed.

Advantageous Effects of Invention

The polyamide-based resin expanded beads of the present invention have a crystal structure in which an intrinsic peak and a high-temperature peak having a peak top temperature on a higher temperature side than a peak top temperature of the intrinsic peak appear in a DSC curve obtained under a predetermined condition (the above condition 1). An amount of heat of fusion of the high-temperature peak is 5 J/g or more and 50 J/g or less, whereby a molded article of expanded beads exhibiting good moldability can be provided.

In the polyamide-based resin expanded beads of the present invention having the high-temperature peak, a coefficient of variation of the amount of heat of fusion of the high-temperature peak is 20% or less. This makes it possible to further improve the moldability of the molded article of expanded beads. Specifically, the polyamide-based resin expanded beads of the present invention are excellent in uniformity of secondary expandability in in-mold molding, and are also excellent in uniformity of fuse-bond characteristics between beads. For this reason, the polyamide-based resin expanded beads of the present invention can provide a molded article of expanded beads having more excellent moldability. The molded article of expanded beads thus obtained is excellent in initial elasticity during compression.

Therefore, the molded article of polyamide-based resin expanded beads of the present invention, which is an in-mold molded article of the polyamide-based resin expanded beads of the present invention described above, is excellent in initial elasticity during compression.

The method for producing the polyamide-based resin expanded beads of the present invention makes it possible to easily produce the polyamide-based resin expanded beads of the present invention described above.

BRIEF DESCRIPTION OF DRAWINGS

FIG. 1 is a DSC curve of polyamide-based resin expanded beads of the present invention measured based on heat-flux differential scanning calorimetry.

DESCRIPTION OF EMBODIMENTS

Hereinafter, polyamide-based resin expanded beads of the present invention, a method for producing polyamide-based resin expanded beads (hereinafter, also referred to as a production method of the present invention), and a molded article of polyamide-based resin expanded beads (hereinafter, also referred to as a molded article of expanded beads of the present invention) will be described in order. In the following description, technical contents such as overlapping terms, measurement methods, and materials to be used can be referred to the respective descriptions as appropriate.

In the following description, preferable numerical ranges of the present invention may be indicated as appropriate. In this case, the preferred range, more preferred range, and particularly preferred range for the upper and lower limits of the numerical range can be determined from all combinations of upper and lower limits.

The present invention has been made by sufficiently considering properties peculiar to a polyamide-based resin. That is, as described above, the polyamide-based resin is a material which is excellent in strength and heat resistance, and is expected to be developed in various fields as the raw material of the molded article of expanded beads. However, in practice, in the field of the molded article of expanded beads, the polyamide-based resin has a remarkably low degree of utilization as compared with a polypropylene-based resin and the like that are commonly used. As a factor thereof, it is considered that the polyamide-based resin has a characteristic peculiar to the polyamide-based resin, which makes it difficult to apply a technique related to a molded article of expanded beads using another resin. The polyamide-based resin has a lower crystallization rate during heating and higher water absorbability than those of the polypropylene-based resin. The present inventors have found that these characteristics make it difficult to cause the polyamide-based resin to provide a better molded article of expanded beads than that produced by the polypropylene-based resin. As a result of intensive studies, the present invention has been completed. Hereinafter, the present invention will be described in detail.

[1] Polyamide-Based Resin Expanded Beads

The polyamide-based resin expanded beads of the present invention contain a polyamide-based resin as a base material resin, and have a crystal structure in which a melting peak (intrinsic peak) intrinsic to the polyamide-based resin and a melting peak (high-temperature peak) having a peak top temperature on a higher temperature side than a peak top temperature of the intrinsic peak appear in a DSC curve obtained under the following condition 1.

(Condition 1)

On the basis of heat-flux differential scanning calorimetry of JIS K7122-1987, the polyamide-based resin expanded beads are used as test pieces, and heated and melted at a heating rate of 10° C./min from 30° C. to a temperature higher by 30° C. than that at the end of the melting peak to obtain the DSC curve.

In the present specification, a test piece subjected to the following condition adjustment is used for measuring the DSC curve. First, the obtained polyamide-based resin expanded beads are placed in an environment at a temperature of 60° C. for 24 hours or more, and then slowly cooled to room temperature (23° C.). Next, the slowly cooled polyamide-based resin expanded beads are allowed to stand in an environment at a temperature of 23° C. and a relative humidity of 50% for 24 hours or more to perform the condition adjustment. As the test piece for the DSC measurement, 1 mg to 3 mg of the expanded beads subjected to the condition adjustment are used. When the mass per expanded bead is less than 1 mg, a plurality of expanded beads having a total mass of 1 mg to 3 mg may be used as it is for measurement. When the mass per expanded bead is 1 mg to 3 mg, one expanded bead may be used as it is for measurement. When the mass per expanded bead exceeds 3 mg, one cut sample having a mass of 1 mg to 3 mg obtained by cutting one expanded bead may be used for measurement. As the measuring apparatus, for example, a high-sensitive differential scanning calorimeter "EXSTAR DSC7020" (manufactured by SII NanoTechnology Inc.) or the like can be used.

In the polyamide-based resin expanded beads of the present invention, an amount of heat of fusion of the high-temperature peak is within a range of 5 J/g or more and 50 J/g or less, and a coefficient of variation of the amount of heat of fusion of the high-temperature peak is adjusted to 20% or less.

The polyamide-based resin expanded beads of the present invention having the above configuration can provide a molded article of expanded beads having good moldability. The polyamide-based resin expanded beads of the present invention are particularly excellent in uniformity of secondary expandability and uniformity of fuse-bond characteristics. Furthermore, the polyamide-based resin expanded beads of the present invention can provide a molded article of expanded beads excellent in initial elasticity during compression. In the present invention, secondary expansion means that the expanded beads are secondarily expanded when in-mold molding is performed using the produced expanded beads.

FIG. 1 shows a DSC curve of polyamide-based resin expanded beads according to an embodiment of the present invention obtained under condition 1. As shown in FIG. 1, the polyamide-based resin expanded beads of the present invention show not only an intrinsic peak a but also a high-temperature peak b having a peak top temperature on a higher temperature side than the peak top temperature of the intrinsic peak a as a melting peak in the DSC curve measured based on heat-flux differential scanning calorimetry. Although one high-temperature peak b is present in FIG. 1, the number of high-temperature peaks b may be two or more in the range of the condition 1.

The amount of heat of fusion of the high-temperature peak b is 5 J/g or more and 50 J/g or less. When the number of the high-temperature peaks b is two or more, the total of the amounts of heat of fusion of the peaks is adjusted to 5 J/g or more and 50 J/g or less. The polyamide-based resin expanded beads having the high-temperature peak b indicating an amount of heat of fusion within the above range are excellent in moldability during in-mold molding. From the above viewpoint, the amount of heat of fusion is preferably 6 J/g or more, and more preferably 7 J/g or more. From the above viewpoint, the amount of heat of fusion is preferably 25 J/g or more, and more preferably 20 J/g or more.

The amount of heat of fusion (endothermic energy) of the high-temperature peak of the polyamide-based resin expanded beads corresponds to, for example, the area of the high-temperature peak b having a peak top temperature on a higher temperature side than the peak top temperature of the intrinsic peak a in the DSC curve shown in FIG. 1. The amount of heat of fusion (endothermic energy) of the high-temperature peak can be determined as follows. First, as shown in FIG. 1, a straight line connecting a point I at 150° C. on the DSC curve and a point II indicating a temperature at the end of the melting peak on the DSC curve is drawn. Next, an intersection of a straight line passing through a point III on the DSC curve corresponding to a valley between the intrinsic peak and the high-temperature peak b and perpendicular to a graph horizontal axis indicating a temperature and a straight line connecting the point I and the point II is defined as a point IV. The intrinsic peak a is a melting peak intrinsic to the polyamide-based resin. The high-temperature peak b is a melting peak having a peak top temperature on a higher temperature side than the peak top temperature of the intrinsic peak a. The area of a portion (shaded portion) surrounded by a straight line connecting the point IV and the point II, a straight line connecting the point III and the point IV, and the DSC curve connecting the point III and the point II, as thus obtained corresponds to the endothermic energy of the high-temperature peak b.

The high-temperature peak b does not appear in the second DSC curve.

However, the intrinsic peak a appears in both the first DSC curve and the second DSC curve.

When two or more high-temperature peaks b appear in the first DSC curve, the amount of heat of fusion of the high-temperature peak b means the total heat amount of all the high-temperature peaks b. The temperature at the end of the melting peak on the DSC curve refers to a temperature at the end of the melting peak of the high-temperature peak b on the highest-temperature side.

The second DSC curve is obtained under condition 2 described later.

The intrinsic peak is a melting peak caused by a crystal structure intrinsic to a polyamide-based resin used as a raw material of expanded beads. Meanwhile, the high-temperature peak is a melting peak caused by secondary crystals formed by a thermal history until resin beads are expanded to obtain expanded beads. The difference between the peak top temperature of the intrinsic peak and the peak top temperature of the high-temperature peak is preferably 10° C. or higher, more preferably 12° C. or higher, and still more preferably 15° C. or higher. Meanwhile, the difference between the peak top temperature of the intrinsic peak and the peak top temperature of the high-temperature peak is preferably 40° C. or lower, more preferably 30° C. or lower, and still more preferably 25° C. or lower. When two or more high-temperature peaks appear in the first DSC curve, the difference between the peak top temperature of the intrinsic peak and the peak top temperature of the high-temperature peak is compared between the peak top temperature of the high-temperature peak on the lowest temperature side and the peak top temperature of the intrinsic peak.

When expanded beads are produced using a polyamide-based resin, polyamide-based resin expanded beads having a characteristic crystal structure exhibiting the fixed peak and the high-temperature peak described above can be produced by setting heating conditions for the polyamide-based resin before expanding as appropriate.

The second DSC curve can be obtained by the following method. First, based on the above-described condition 1, the test piece is heated from 30° C. to a temperature higher by 30° C. than that at the end of the melting peak at a heating rate of 10° C./min to obtain a first DSC curve. Thereafter, a second DSC curve can be obtained under the following condition 2.

(Condition 2)

After obtaining the first DSC curve as in the above-described condition 1, the test piece is kept at a temperature higher by 30° C. than that at the end of the melting peak for 10 minutes, then cooled to 30° C. at a cooling rate of 10° C./min, and heated and melted again at a heating rate of 10° C./min to a temperature higher by 30° C. than that at the end of the melting peak, thereby obtaining the second DSC curve.

The second DSC curve shows only an intrinsic peak (second intrinsic peak) and no high-temperature peak. The peak top temperature of the intrinsic peak of the second DSC curve corresponds to the intrinsic melting point of the polyamide-based resin which is a raw material for producing the polyamide-based resin expanded beads. The intrinsic peak appears in both the first DSC curve and the second DSC curve. The peak top temperature of the intrinsic peak at the first time may be slightly different from that at the second time, but the difference is 5° C. or lower, and usually 2° C. or lower. The peak top temperature of the high-temperature peak indicated by the first DSC curve is located higher than the peak top temperature of the intrinsic peak indicated by the second DSC curve.

In the meantime, the mass productivity of expanded beads is required when the expanded beads are commercially used. It is common that an apparatus for mass producing expanded beads uses a large-volume sealed container. The volume of the sealed container is not particularly limited, but is, for example, about 400 L to 5000 L. Polyamide-based resin expanded beads produced using such a large-volume sealed container may be inferior in moldability when producing a molded article of expanded beads. In particular, it has been found that the polyamide-based resin expanded beads have room for improvement with respect to uniformity of secondary expandability of the amide-based resin expanded beads during in-mold molding, uniformity of fuse-bond characteristics between beads, and initial elasticity during compression of the obtained molded article of expanded beads.

As a result of studying such a problem, the following findings were obtained. In particular, when the volume of the sealed container increases, the release time of the expanded beads in an expanding step increases in the production of the polyamide-based resin expanded beads. As a result, it was found that the difference in crystallinity is large between the polyamide-based resin expanded beads released in the first half of the expanding step and the polyamide-based resin expanded beads released in the latter half of the expanding step. From such findings, in the present invention, the coefficient of variation of the amount of heat of fusion of the high-temperature peak is kept at 20% or less so as not to cause a large difference in crystallinity of the polyamide-based resin expanded beads released in the series of expanding step. As a result, the polyamide-based resin expanded beads of the present invention can provide a molded article of expanded beads in which uniformity of the secondary expandability, uniformity of fuse-bond characteristics between beads, and initial elasticity during compression are improved. The coefficient of variation is preferably 15% or less, more preferably 9% or less, and still more preferably 6% or less.

Since the polyamide-based resin expanded beads of the present invention have a small coefficient of variation of the amount of heat of fusion of the high-temperature peak, the polyamide-based resin expanded beads are excellent in uniformity of secondary expandability and uniformity of fuse-bond characteristics during in-mold molding. As a result, a good molded article can be obtained in a wide molding range. In particular, the polyamide-based resin has very high water vapor permeability as compared with the polypropylene-based resin. For this reason, the polyamide-based resin expanded beads tend to have a weak secondary expanding force during in-mold molding using steam. Therefore, in order to improve the in-mold moldability of the polyamide-based resin expanded beads, it is important to suppress the coefficient of variation of the amount of heat of fusion of the high-temperature peak of the expanded beads to be small.

In the present invention, the coefficient of variation C of the amount of heat of fusion of the high-temperature peak is determined from the following formulas (1) and (2).
[Expression 1]

$$\text{COEFFICIENT OF VARIATION } C \text{ (\%)} = (\text{STANDARD DEVIATION } V \text{ OF AMOUNTS OF HEAT OF FUSION OF HIGH-TEMPERATURE PEAK/AVERAGE VALUE } Tav \text{ OF AMOUNTS OF HEAT OF FUSION OF HIGH-TEMPERATURE PEAK)} \times 100 \quad (1)$$

[Expression 2]

$$\text{STANDARD DEVIATION } V = (\Sigma(T_i - T_{av})^2/(n-1))^{1/2} \quad (2)$$

50 or more beads are collected from the polyamide-based resin expanded beads obtained from an expanding step start time to an expanding step end time. Using these as samples, the coefficient of variation C of the amount of heat of fusion of the high-temperature peak is determined from formulas (1) and (2). Tav represents the arithmetic mean value of the amounts of heat of fusion of the 50 or more samples. n represents the number of samples.

The polyamide-based resin expanded beads of the present invention preferably have a small difference in amount of heat of fusion between the expanded beads. Specifically, among the 50 or more expanded beads collected as described above, the difference in amount of heat of fusion between the expanded bead having the amount of heat of fusion of the largest high-temperature peak and the expanded bead having the amount of heat of fusion of the smallest high-temperature peak is preferably 5 J/g or less, more preferably 3 J/g or less, and still more preferably 2 J/g or less.

In the present invention, the polyamide-based resin is preferably a modified polyamide-based resin modified with one or more compounds (hereinafter, also referred to as a modifier) selected from a carbodiimide compound, an oxazoline compound, an isocyanate compound, and an epoxy compound. The polyamide-based resin is modified with the compound, whereby a part or all of the molecular chain terminals of the polyamide-based resin are blocked. Among the above compounds, the modifier is preferably a carbodiimide compound. Specific examples thereof include aromatic monocarbodiimides such as bis(dipropylphenyl)carbodiimide, aromatic polycarbodiimide and aliphatic polycarbodiimides such as poly(4,4'-dicyclohexylmethanecarbodiimide).

Examples of bis(dipropylphenyl)carbodiimide include "Stabaxol 1-LF" manufactured by Rhein Chemie Corp. Examples of the aromatic polycarbodiimide include "Stabaxol P", "Stabaxol P100", and "Stabaxol P400" manufactured by Rhein Chemie Corp. Examples of poly(4,4'-dicyclohexylmethanecarbodiimide) include "CARBODILITE LA-1" manufactured by Nisshinbo Chemical Inc.

Among the carbodiimide compounds, polymer-type carbodiimide compounds such as the aromatic polycarbodiimide and the aliphatic polycarbodiimide are preferable. For example, when a polyamide-based resin is modified in an extruder, a polymer-type carbodiimide compound is prevented from volatilizing before the polyamide-based resin is modified. The polymer-type carbodiimide compound refers to a compound having a number average molecular weight of about 1000 or more. Among the carbodiimide compounds, polyfunctional type carbodiimide compounds such as the aromatic polycarbodiimide and the aliphatic polycarbodiimide are preferable. These modifiers may be used alone, or may be used in combination of two or more thereof.

The polyamide-based resin modified with the modifier refers to a resin in which the functional group at a molecular chain terminal is blocked with the modifier. The hydrolysis of the modified polyamide-based resin is further suppressed. This makes it easy to obtain polyamide-based resin expanded beads that can withstand in-mold molding. The ratio at which the terminal group of the molecular chain of the polyamide-based resin is blocked with the modifier (terminal blocking ratio) is preferably 50% or more, more preferably 70% or more, and still more preferably 90% or more from the viewpoint of suppressing hydrolysis. The terminal blocking ratio is determined as follows. The number average absolute molecular weight (Mn) of the polyamide-based resin is measured by a GPC-MALS method (gel permeation chromatography-multi-angle light scattering detection method) or the like, and the total number of molecular chain terminal groups is calculated using the relational expression: total number of molecular chain terminal groups (eq/g)=2/Mn. The number of carboxyl group terminals (eq/g) of the polyamide-based resin is measured by titration I, and the number of amino group terminals (eq/g) is measured by titration II. The terminal blocking ratio can be determined by the following formula (3). The titration I is performed by titrating a solution of polyamide in benzyl alcohol with 0.1 N sodium hydroxide. The titration II is performed by titrating a solution of polyamide in phenol with 0.1 N hydrochloric acid.
[Expression 3]

$$\text{TERMINAL BLOCKING RATIO (\%)} = [(A-B)/A] \times 100 \quad (3)$$

In the formula (3), A represents the total number of the molecular chain terminal groups (this is usually equal to twice the number of polyamide molecules). B represents the total number of unblocked carboxyl group terminals and amino group terminals, as measured by the titration I and the titration II.

When the polyamide-based resin is the modified polyamide-based resin, it is considered that the progress of secondary crystallization is further suppressed in the expanding step. For this reason, even when the expanding step takes a long time, the difference between the crystallinity of the expanded beads in the first half of the expanding step and the crystallinity of the expanded beads in the latter half of the expanding step can be suppressed to be smaller. The secondary crystallization in the expanding step as used herein means that the polyamide-based resin crystallized in the crystallization treatment step or the like before the expanding step is further crystallized in the expanding step.

The reason why the progress of the secondary crystallization in the expanding step is further suppressed in the case of the modified polyamide-based resin is not clear, but the following reasons are considered.

One reason is considered to be that a branched chain is introduced into the polyamide-based resin by the modifier. For example, it is considered that, in polyamide-based resin beads in which a branched chain is introduced into a polyamide-based resin by using a polyfunctional type modifier, the movement of the molecular chain in the crystallization process is hindered by the introduction of the branched chain, whereby the progress of the crystallization under heating conditions in the expanding step is suppressed.

The second reason is considered to be that the polyamide-based resin is increased in molecular weight by the modifier. For example, in a bifunctional type modifier, molecular chain terminals of a polyamide-based resin are bonded to each other via the modifier, so that the molecular weight increases. By modifying the polyamide-based resin with a modifier having a large molecular weight, the molecular weight of the polyamide-based resin increases by the molecular weight of the modifier. It is considered that in the polyamide-based resin beads blocked with the modifier as described above, the proportion of the high molecular weight polyamide-based resin increases, and therefore the progress of the crystallization is suppressed under heating in the expanding step.

The crystallization rate of the polyamide-based resin can be evaluated by a semi-crystallization time. The semi-crystallization time of the polyamide-based resin can be determined from the semi-crystallization time under the condition 20° C. below the melting point of the polyamide-based resin expanded beads. For example, in the case of a polyamide composed of a homopolymer, the semi-crystallization time is preferably 280 seconds or more, and preferably 290 seconds or more. In the case of a polyamide composed of a polyamide copolymer, the time is preferably 350 seconds or more, and more preferably 400 seconds or more. The melting point of the polyamide-based resin expanded beads is determined from the peak top temperature of the second intrinsic peak in the above condition 2.

For the semi-crystallization time, the polyamide-based resin expanded beads are used, and heat-pressed at a temperature higher than the melting point of the polyamide-based resin constituting the polyamide-based resin expanded beads for 10 minutes or more to obtain a film-shaped sample of about 0.1 mm. A support holding the film-shaped sample is immersed in an oil bath held at the crystallization temperature of the polyamide-based resin to measure transmitted light that increases with the crystallization of the sample, and the semi-crystallization time can be calculated from the Avrami equation. As the measuring apparatus, for example, a crystallization rate measuring apparatus (MK-801) manufactured by Kotaki Seisakusho Co., Ltd. can be used. The measurement of the semi-crystallization time is to determine a crystallization rate caused by a crystal structure intrinsic to a polyamide-based resin. The fact that the crystallization rate caused by the crystal structure intrinsic to the polyamide-based resin is low is considered to mean that the crystallization rate of a crystal structure caused by a secondary crystal formed by a thermal history when expanded beads are obtained is also low. Therefore, the semi-crystallization time makes it possible to predict the degree of suppression of the progress of the crystallization of the crystal structure caused by the production of the polyamide-based resin expanded beads.

As a method for confirming that a branched chain is introduced into the polyamide-based resin by modification, for example, the introduction can be confirmed from the shrinkage factor of the polyamide-based resin. In general, a resin having a branch tends to have a smaller molecular size than that of a linear resin having the same absolute molecular weight. The shrinkage factor is an index of the ratio of the size of a molecule of a polyamide-based resin into which a molecular chain is introduced to a linear polymer having an assumed identical absolute molecular weight. That is, as the degree of branching of the resin increases, the shrinkage factor tends to decrease. This shows that the polyamide-based resin having a shrinkage factor of less than 1.0 is a branched polyamide-based resin. As a method for obtaining the shrinkage factor, for example, a GPC-MALS method can be adopted.

The closed cell ratio of the polyamide-based resin expanded beads is preferably 85% or more, more preferably 88% or more, and still more preferably 90% or more. The closed cell ratio is improved by using a modified polyamide-based resin as the polyamide-based resin of the base material resin. The expanded beads having the closed cell ratio satisfying the above range provides a molded article of expanded beads having particularly good moldability. The closed cell ratio is a ratio of the volume of closed cells to the volume of all cells in expanded beads, which is determined using an air-comparison pycnometer based on ASTM-D2856-70.

The apparent density of the polyamide-based resin expanded beads is preferably 10 $kg/m^3$ or more, more preferably 30 $kg/m^3$ or more, and still more preferably 50 $kg/m^3$ or more. The apparent density of the polyamide-based resin expanded beads is preferably 300 $kg/m^3$ or less, more preferably 250 $kg/m^3$ or less, still more preferably 200 $kg/m^3$ or less, and particularly preferably 150 $kg/m^3$ or less.

When the apparent density of the expanded beads is within the above range, the excessive shrinkage of the expanded beads and a molded article made of the expanded beads is suppressed, so that a good molded article of expanded beads is likely to be obtained. The apparent density of the polyamide-based resin expanded beads is measured by the following method.

The obtained polyamide-based resin expanded beads are placed in an environment at a temperature of 60° C. for 24 hours, then slowly cooled to normal temperature (23° C.), and then left to stand for 24 hours under conditions of a relative humidity of 508, 23° C., and 1 atm to perform condition adjustment. Next, the mass W1 of the expanded beads having a bulk volume of about 500 $cm^3$ is measured, and subsequently the expanded beads are immersed in a measuring cylinder containing water at a temperature of 23° C. using a wire mesh. In consideration of the volume of the wire mesh, the volume V1 $[cm^3]$ of the expanded beads read from the amount of water level rise is measured. The apparent density of the expanded beads is determined by dividing the mass W1 [g] of the expanded beads by the volume V1 $[cm^3]$ (W1/V1) and converting the unit into $[kg/m^3]$.

The polyamide-based resin expanded beads preferably have a moisture content ratio of 18 or more, more preferably 2% or more, and still more preferably 3% or more. The upper limit of the moisture content ratio of the polyamide-based resin expanded beads is about 20%, preferably 10% or less, and more preferably 5% or less.

When the polyamide-based resin expanded beads satisfy the above moisture content ratio, the polyamide-based resin constituting the polyamide-based resin expanded beads is plasticized with water. For this reason, when the polyamide-based resin expanded beads are subjected to in-mold molding, the expanded beads can be sufficiently fused to each other with a low molding steam pressure.

The moisture content ratio in the expanded beads can be determined by a Karl Fischer moisture measurement apparatus. Specifically, the moisture content can be determined by the following method. The polyamide-based resin expanded beads are weighed. The polyamide-based resin expanded beads are then heated using a heating moisture vaporizer to vaporize moisture inside the expanded beads. The vaporized moisture is measured through Karl Fischer titration (coulometric titration method) using the Karl Fischer moisture measuring apparatus to determine the moisture content ratio in the expanded beads. The moisture content ratio of the polyamide-based resin beads is also measured in the same manner as described above.

Examples of the polyamide-based resin in the present specification include polyamides and polyamide copolymers.

Examples of the polyamide include homopolymers such as poly(6-aminohexanoic acid) (polycaproamide, Nylon 6), which is also known as poly(caprolactam), poly(laurolactam) (Nylon 12), poly(hexamethylene adipamide) (Nylon 66), poly(7-aminoheptanic acid) (Nylon 7), poly(8-aminooctanoic acid) (Nylon 8), poly(9-aminononanoic acid) (Nylon 9), poly(10-aminodecanoic acid) (Nylon 10), poly(11-aminoundecanoic acid) (Nylon 11), poly(hexamethylene sebacamide) (Nylon 610), poly(decamethylene sebacamide) (Nylon 1010), poly(hexamethylene azelamide) (Nylon 69), poly(tetramethylene adipamide) (Nylon 46), poly(tetramethylene sebacamide) (Nylon 410), poly(pentamethylene adipamide) (Nylon 56), and poly(pentamethylene sebacamide) (Nylon 510).

The polyamide copolymer means a copolymer having two or more kinds of repeating units and having an amide bond as at least a part of each repeating unit.

Examples of the polyamide copolymer include caprolactam/hexamethylenediaminoadipic acid (nylon 6/66), caprolactam/hexamethylene diaminoadipic acid/lauryl lactam (nylon 6/66/12), and a caprolactam/lauryl lactam copolymer (Nylon 6/12).

Among the above polyamide-based resins, a polyamide-based resin selected from Nylon 6, Nylon 66, Nylon 6/66/12, and Nylon 6/66 is preferable.

The polyamide copolymer may be a block copolymer in which a certain number of the same amide repeating units are followed by a certain number of a different type of amide, or may be a random copolymer in which different types of amides are randomly arranged. In particular, the polyamide copolymer is preferably a random copolymer. When the polyamide copolymer is a random copolymer, the polyamide-based resin expanded beads can be molded at a relatively low molding steam pressure when the polyamide-based resin expanded beads are subjected to in-mold molding.

The polyamide-based resin expanded beads may contain one or more of other thermoplastic resins and thermoplastic elastomers as long as the object and effect of the present invention are not impaired. Examples of the other thermoplastic resins and the thermoplastic elastomers include one or more selected from polyethylene-based resins, polypropylene-based resins, polystyrene-based resins, vinyl acetate resins, thermoplastic polyester resins, acrylic acid ester resins, methacrylic acid ester resins, rubbers such as ethylene-propylene-based rubbers, ethylene-1-butene rubbers, propylene-1-butene rubbers, ethylene-propylene-diene-based rubbers, isoprene rubbers, neoprene rubbers, and nitrile rubbers, and hydrogenated products of styrene-diene block copolymers and styrene-diene block copolymers. The blending amount of the other thermoplastic resin and the thermoplastic elastomer is preferably 20 parts by mass or less, more preferably 10 parts by mass or less, and still more preferably 5 parts by mass or less with respect to 100 parts by mass of the polyamide-based resin, and then it is particularly preferable that the resin constituting the polyamide-based resin expanded beads is composed only of the polyamide-based resin.

In the polyamide-based resin expanded beads, one or more of various commonly used additives such as cell controlling agents, antistatic agents, conductivity-imparting agents, lubricants, antioxidants, ultraviolet absorbers, flame retardants, metal deactivators, colorants (pigments and dyes and the like), crystal nucleating agents, and fillers may, as necessary, be blended in addition to the polyamide-based resin as appropriate. Examples of the cell controlling agents include inorganic cell controlling agents such as talc, sodium chloride, calcium carbonate, silica, titanium oxide, gypsum, zeolite, borax, aluminum hydroxide, alum, and carbon, and organic cell controlling agents such as phosphoric acid-based compounds, amine-based compounds, and polytetrafluoroethylene (PTFE). The addition amount of these various additives varies depending on the purpose of use of the molded article of expanded beads, but is preferably 20 parts by mass or less with respect to 100 parts by mass of the polymer component constituting the polyamide-based resin expanded beads. The addition amount is more preferably 10 parts by mass or less, and still more preferably 5 parts by mass or less.

The melting point of the polyamide-based resin beads constituting the polyamide-based resin expanded beads of the present invention is not particularly limited, but is preferably 175° C. or higher, more preferably 180° C. or higher, and still more preferably 185° C. or higher. Meanwhile, from the viewpoint of easy temperature control in the expanding step, the melting point is preferably 280° C. or lower, more preferably 260° C. or lower, still more preferably 240° C. or lower, and particularly preferably 230° C. or lower. When the melting point of the polyamide-based resin expanded beads satisfies the above range, not only polyamide-based resin expanded beads having a low apparent density but also polyamide-based resin expanded beads excellent in heat resistance is likely to be obtained, which is preferable.

The melting point of the polyamide-based resin beads can be determined from the peak top temperature of the intrinsic peak of the second DSC curve obtained under the above condition 2 using the polyamide-based resin beads as a test piece.

The flexural modulus of the polyamide-based resin in the present specification is preferably 1000 MPa or more, more preferably 1200 MPa or more, and still more preferably 1500 MPa or more. When the flexural modulus of the polyamide-based resin is within the above range, the excessive shrinkage of expanded beads is suppressed even when exposed to normal temperature after expanding due to the high flexural modulus, so that highly expanded beads are likely to be obtained, which is preferable. Due to the high flexural modulus, excellent in-mold moldability is obtained, which is preferable. The upper limit of the flexural modulus of the polyamide-based resin is about 3000 MPa.

The flexural modulus of the polyamide-based resin can be determined by measurement in accordance with JIS K7171: 2016 after the polyamide-based resin is left standing at a temperature of 23° C. and a relative humidity of 50% for 24 hours.

The density of the polyamide-based resin is preferably 1.05 g/cm$^3$ or more, and preferably 1.1 g/cm$^3$ or more. The density can be determined on the basis of the method of ISO 1183-3.

[2] Method for Producing Polyamide-Based Resin Expanded Beads

Hereinafter, a production method of the present invention will be described. The production method of the present invention is a desirable aspect of the method for producing the polyamide-based resin expanded beads of the present invention described above. However, the following description does not limit the method for producing the above-described polyamide-based resin expanded beads of the present invention at all.

The production method of the present invention includes a dispersion step, an expanding agent applying step, a crystallization treatment step, and an expanding step.

The dispersion step is a step of dispersing polyamide-based resin beads in an aqueous dispersion medium in a sealed container. The expanding agent applying step is a step of adding an expanding agent to a polyamide-based resin. The crystallization treatment step is a step of heating the polyamide-based resin beads dispersed in the aqueous dispersion medium to form a high-temperature peak. The expanding step is a step of releasing the polyamide-based resin beads having a high-temperature peak and containing the expanding agent from the sealed container together with the aqueous dispersion medium under a pressure lower than a pressure in the sealed container to expand the polyamide-based resin beads. In the expanding step, when the polyamide-based resin beads containing the expanding agent are released from the sealed container, a temperature rise adjustment that raises the temperature in the sealed container at a rate of 0.3° C. or higher and 1.5° C. or lower per 10 minutes is performed.

According to such a production method, the polyamide-based resin expanded beads of the present invention can be satisfactorily produced.

Hereinafter, the production method of the present invention will be described in detail.

In the production method of the present invention, a modified polyamide-based resin is preferably used as a base material resin. The modified polyamide-based resin is a resin in which polyamide-based resin beads are modified with one or more compounds selected from a carbodiimide compound, an oxazoline compound, an isocyanate compound, and an epoxy compound.

Such modification may be performed before the expanding step. For example, it is preferable that, when the polyamide-based resin beads are produced, a modifier and an unmodified polyamide-based resin are kneaded with an extruder to modify the polyamide-based resin, thereby obtaining the polyamide-based resin beads. As another method, a modified polyamide-based resin modified in advance may be used as a raw material, and granulated, or the polyamide-based resin beads may be modified by adding a modifier in the dispersion step, or the crystallization treatment step described later. By the modification with the compound, a part or all of the molecular chain terminal of the polyamide-based resin can be blocked. The blending amount of the modifier is preferably 0.1 parts by mass or more and 5 parts by mass or less, and more preferably 0.5 parts by mass or more and 3 parts by mass or less with respect to 100 parts by mass of the polyamide-based resin. For the details of the modifier, reference is made to the description of the polyamide-based resin expanded beads of the present invention described above.

[Dispersion Step]

The dispersion step is a step of dispersing the polyamide-based resin beads in an aqueous dispersion medium such as water in a sealed container to obtain a dispersion liquid. Examples of the sealed container include an autoclave that can be pressurized. The method for dispersing the polyamide-based resin beads in the dispersion medium is not particularly limited, and a known method can be used. For example, a dispersion liquid can be obtained by using a sealed container equipped with a stirrer, adding polyamide-based resin beads to an aqueous dispersion medium charged in the container, and stirring the mixture. Examples of the aqueous dispersion medium include water or a liquid material mainly composed of water, and among them, water is preferably used.

If necessary, the dispersion medium may be added the dispersants of inorganic substances etc. such as aluminum oxide, tricalcium phosphate, magnesium pyrophosphate, zinc oxide, kaolin, mica, talc, and smectite, and the dispersion aids of anionic surfactants etc. such as sodium dodecylbenzene sulfonate and sodium alkane sulfonate. The mass ratio of the polyamide-based resin beads to the dispersant (resin beads/dispersant) is preferably 20 or more, and more preferably 30 or more. The mass ratio of the polyamide-based resin beads to the dispersant (resin beads/dispersant) is preferably 2000 or less, and more preferably 1000 or less. The mass ratio of the dispersant to the dispersion aid (dispersant/dispersion aid) is preferably 1 or more, and more preferably 10 or more. The mass ratio of the dispersant to the dispersion aid (dispersant/dispersion aid) is preferably 500 or less, and more preferably 100 or less.

The method for producing the polyamide-based resin beads used in the present invention is not particularly limited, and the polyamide-based resin beads can be produced by a known method. For example, the polyamide-based resin beads can be produced by a method such as a strand cut method, a hot cut method, or an underwater cut method (UWC method). The strand cutting method is a method for obtaining resin beads as follows. First, a polyamide-based resin and, if necessary, an additive such as a cell controlling agent or a colorant are charged into an extruder and kneaded to obtain a melt-kneaded product. Next, the melt-kneaded product is extruded into a strand form through a small hole of a die attached to the tip of the extruder. The melt-kneaded product in a strand form is cut with a pelletizer into a predetermined mass to obtain beads. The hot cut method is a method in which a melt-kneaded product is extruded into a gas phase and then immediately cut to obtain beads. The underwater cut method (UWC method) is a method in which a melt-kneaded product is extruded into water and then immediately cut to obtain beads.

[Blowing Agent Applying Step]

The expanding agent applying step is a step of adding an expanding agent to the polyamide-based resin beads. Examples of the method for adding the expanding agent to the polyamide-based resin beads include a method in which the polyamide-based resin and the expanding agent are kneaded to add the expanding agent to the polyamide-based resin beads when the polyamide-based resin beads are produced, a method in which the expanding agent is added to the polyamide-based resin beads in a container different from the container in the dispersion step, and a method in which the expanding agent is added to the polyamide-based resin beads in the container in which the dispersion step is performed.

That is, in the present production method, the dispersion step, the crystallization treatment step, and the expanding step can be performed in this order, and the expanding agent applying step can be performed at an optional stage before the expanding step. The timing of applying the expanding agent may be divided into a plurality of times.

As the expanding agent used in the expanding agent applying step, a physical expanding agent can be used. Examples of the physical expanding agent include, as organic physical expanding agents, aliphatic hydrocarbons such as propane, butane, pentane, hexane, and heptane, alicyclic hydrocarbons such as cyclopentane and cyclohexane, halogenated hydrocarbons such as chlorofluoromethane, trifluoromethane, 1,1-difluoroethane, 1,1,1,2-tetrafluoroethane, methyl chloride, ethyl chloride, and methylene chloride, and dialkyl ethers such as dimethyl ether, diethyl ether, and methyl ethyl ether. Examples of the inorganic physical expanding agent include carbon dioxide, nitrogen, helium, argon, and air. Among the physical expanding agents, inorganic physical expanding agents are preferable, carbon dioxide or nitrogen is more preferable, and carbon dioxide is still more preferable from the viewpoints of having less impact on the environment, not being flammable, and being excellent in safety.

In the following description, an example in which the dispersion step, the expanding agent applying step, the crystallization treatment step, and the expanding step are continuously performed in the same sealed container will be described. These steps may be performed independently of each other, or at least some of the steps may overlap each other.

When the expanding agent applying step is performed, the timing of adding the expanding agent to the sealed container may be from the dispersion step to before the release of the polyamide-based resin beads (that is, before the expanding step). Examples of the timing include during the dispersion step, at the end of the dispersion step, between the end of the dispersion step and the start of the crystallization treatment step, and during the crystallization treatment step. Among the above, from the viewpoint of being likely to adjust the impregnation pressure of the expanding agent with respect to the resin beads, it is preferable to add the expanding agent at least immediately before the crystallization treatment step.

In the expanding agent applying step, from the viewpoint of sufficiently impregnating the polyamide-based resin beads with the expanding agent in a short time, the pressure in the sealed container is preferably set to 1.5 MPa (G) or more, and more preferably 2.5 MPa (G) or more, and preferably 7 MPa (G) or less, and more preferably 5 MPa (G) or less by adding the expanding agent to the container containing the dispersion liquid. This pressure is referred to as an impregnation pressure. "1.5 MPa (G)" means that the gauge pressure is 1.5 MPa.

[Crystallization Treatment Step]

The crystallization treatment step is a step of raising the temperature of the dispersion liquid to a crystallization treatment temperature T1 in the sealed container and then holding the temperature of the dispersion liquid in a certain temperature range for a certain time. The above-described series of treatments in the crystallization treatment step may be referred to as a crystallization treatment below. By the crystallization treatment described above, a secondary crystal is formed by a thermal history when expanded beads are obtained. The crystallization of the melting peak (high-temperature peak) caused by the secondary crystal can be sufficiently promoted. As a result, the amount of heat of fusion of the high-temperature peak can be adjusted to the above-described range. By performing the crystallization treatment, the polyamide-based resin beads can be satisfactorily impregnated with the expanding agent, and the closed cell ratio of the polyamide-based resin expanded beads to be produced is likely to be adjusted to the above-described desired range.

Even when the polyamide-based resin beads containing the modified polyamide-based resin as the base material resin are used, a temperature holding time in the crystallization treatment is prolonged, or a temperature rise rate in the crystallization treatment step is slowed, whereby the crystallization can be sufficiently promoted to form a desired high-temperature peak.

The certain temperature range in the crystallization treatment is preferably equal to or higher than a temperature lower by 90° C. (Tm−90° C.) than the intrinsic melting point (Tm) of the polyamide-based resin, more preferably equal to or higher than a temperature lower by 80° C. (Tm−80° C.), still more preferably equal to or higher than a temperature lower by 70° C. (Tm−70° C.), and particularly preferably equal to or higher than a temperature lower by 65° C. (Tm−65° C.). The certain temperature range is preferably lower than a temperature lower by 50° C. (Tm−50° C.) than the intrinsic melting point (Tm) of the polyamide-based resin, more preferably equal to or lower than a temperature lower by 55° C. (Tm−55° C.), still more preferably equal to or lower than a temperature lower by 57° C. (Tm−57° C.), and particularly preferably equal to or lower than a temperature lower by 59° C. (Tm−59° C.). Here, the intrinsic melting point of the polyamide-based resin is the peak top temperature of the intrinsic peak appearing in the second DSC curve described above.

The certain time in the crystallization treatment is preferably 1 minute or more, more preferably 3 minutes or more, and still more preferably 5 minutes or more, from the viewpoint of obtaining polyamide-based resin expanded beads having a high-temperature peak indicating the amount of heat of fusion within the predetermined range. From the viewpoint of the productivity of the polyamide-based resin expanded beads and from the viewpoint of preventing the hydrolysis of the polyamide-based resin, the above-described certain time is preferably 60 minutes or less, more preferably 40 minutes or less, still more preferably 30 minutes or less, and particularly preferably 20 minutes or less.

Usually, when expanded beads containing a general-purpose resin such as a polypropylene-based resin as a base material resin are produced, the temperature is held at around the melting point of the raw material resin. Such a temperature is the same as or substantially equal to the expanding temperature. However, in the production method of the present invention, taking advantage of the water absorbability of the polyamide-based resin, the polyamide-based resin can be plasticized by the aqueous dispersion medium such as water used as the dispersion liquid. As a result, the melting point of the plasticized polyamide-based resin beads (hereinafter, also referred to as a melting point after plasticization) is significantly lower than the intrinsic melting point of the polyamide-based resin. For this reason, it is possible to obtain polyamide-based resin expanded beads having a high-temperature peak indicating the amount of heat of fusion within the above range by holding the temperature at the above-described low temperature (that is, a certain temperature range after the temperature is raised to the crystallization treatment temperature T1).

The temperature of the dispersion liquid during the crystallization treatment step (crystallization treatment temperature T1) may be constant or may vary within the above-described range. The temperature of the dispersion liquid in the crystallization treatment step can be set in multiple steps within the above-described temperature range. The temperature can also be continuously raised within the above temperature range over an appropriate time. From the viewpoint that the secondary crystal formed by the thermal history when the expanded beads are obtained is likely to be more stably formed, it is preferable to set the temperature to one stage within the above temperature range and hold the temperature for the above time. Setting the temperature to one stage within the above temperature range means setting the holding temperature to a certain temperature. From the viewpoint of causing the polyamide-based resin beads to sufficiently absorb water to be plasticized, the temperature raising rate is preferably 10° C./min or less, and more preferably 7° C./min or less when the polyamide-based resin beads are heated from normal temperature to the crystallization treatment temperature T1. Meanwhile, from the viewpoint of the productivity of the polyamide-based resin expanded beads, the temperature raising rate is preferably 1° C./min or more, and more preferably 2° C./min or more.

[Expanding Step]

The expanding step is a step of releasing the expandable polyamide-based resin beads having a high-temperature peak and containing the expanding agent from the sealed container together with the aqueous dispersion medium under a pressure lower than a pressure in the sealed container (usually under an atmospheric pressure) to expand the polyamide-based resin beads. In the expanding step, when a large number of expandable polyamide-based resin beads are sequentially released from the sealed container, a temperature rise adjustment that raises the temperature in the sealed container at a rate of 0.3° C. or higher and 1.5° C. or lower per 10 minutes is performed.

The polyamide-based resin has higher water absorbability than the polypropylene-based resin. For this reason, in the production method of the present invention in which an aqueous dispersion medium such as water is used as a dispersion medium, the polyamide-based resin beads can be plasticized by water absorption. The melting point of the plasticized polyamide-based resin after plasticization is lower than a melting point Tm intrinsic to the resin before plasticization. For this reason, in the expanding step of expanding the plasticized polyamide-based resin, an expanding temperature T2 may be set based on the melting point after plasticization. As described above, in the production method of the present invention, the expanding step can be performed at a temperature significantly lower than the temperature described in Patent Literature 1.

The temperature (expanding temperature: T2) of the dispersion liquid immediately before expanding is preferably equal to or higher than a temperature lower by 90° C. (Tm−90° C.) than the intrinsic melting point (Tm) of the polyamide-based resin, more preferably equal to or higher than a temperature lower by 80° C. (Tm−80° C.), still more preferably equal to or higher than a temperature lower by 70° C. (Tm−70° C.), and particularly preferably equal to or higher than a temperature lower by 65° C. (Tm−65° C.). The temperature (expanding temperature: T2) of the dispersion liquid immediately before expanding is preferably lower than a temperature lower by 50° C. (Tm−50° C.) than the intrinsic melting point (Tm) of the polyamide-based resin, more preferably equal to or lower than a temperature lower by 55° C. (Tm−55° C.), still more preferably a temperature lower by 57° C. (Tm−57° C.), and particularly preferably a temperature lower by 59° C. (Tm−59° C.). For example, the expanding temperature T2 is preferably within the range of the following formula (4) with respect to the intrinsic melting point (Tm) of the polyamide-based resin. At this time, the relationship between the expanding temperature T2 and the crystallization treatment temperature T1 is preferably T2≥T1.

[Expression 4]

$$Tm-90° \text{ C.} \leq T2 < Tm-50° \text{ C.} \tag{4}$$

As described above, when the expanding step is performed, depending on a time required for the expanding step, there may be a difference in crystallinity between the expanded beads released in the first half of the expanding step and the expanded beads released in the second half of the expanding step. As a result, there has been a possibility that the moldability is poor in in-mold molding using the produced expanded beads. This was presumed to be due to a change in the crystallinity of the polyamide-based resin beads remaining in the sealed container for a relatively long time during the expanding step.

In the production method of the present invention, in order to suppress the change in crystallinity during the expanding step described above, in the expanding step, a temperature rise adjustment that moderately raises the expanding temperature T2 (that is, the temperature of the dispersion liquid in the sealed container) is performed.

It is considered that the crystallization is particularly likely to proceed as the release time of the beads in the expanding step becomes longer. In the expanding step, by moderately raising the expanding temperature T2, it is possible to balance the growth of the crystals and the melting of the crystals and hold a certain heat amount value of melting. As a result, it is considered that the obtained expanded beads can be expanded beads having a small coefficient of variation of an amount of heat of fusion of a high-temperature peak.

The temperature rise adjustment is not particularly limited, but is preferably within the following range from the viewpoint that the coefficient of variation of the amount of heat of fusion of the high-temperature peak of the polyamide-based resin expanded beads to be produced is likely to be adjusted to 20% or less. That is, in the temperature rise adjustment, the temperature is preferably raised at a rate of 0.3° C. or higher per 10 minutes, more preferably raised at a rate of 0.4° C. or higher per 10 minutes, and still more preferably raised at a rate of 0.6° C. or higher per 10 minutes. In the temperature rise adjustment, the temperature is preferably raised at a rate of 1.5° C. or lower per 10 minutes, and more preferably 1° C. or lower per 10 minutes. For example, in the temperature rise adjustment, the temperature is preferably raised at a rate of 0.3° C. or higher and 1.5° C. or lower per 10 minutes.

For example, it is preferable to continuously raise the temperature from the start of expanding to the end of expanding, but the temperature can also be raised stepwise.

When the temperature is raised stepwise, it is preferable to set multiple stages so that the holding time of one stage is 10 minutes or less.

The pressure in the sealed container immediately before the release in the expanding step (expanding pressure) is preferably 0.5 MPa (G) or more, more preferably 1.5 MPa (G) or more, and still more preferably 2.5 MPa (G) or more. The expanding pressure is preferably 7.0 MPa (G) or less, and more preferably 5 MPa (G) or less.

[Molded Article of Polyamide-Based Resin Expanded Beads]

The molded article of expanded beads of the present invention is produced using the polyamide-based resin expanded beads of the present invention. The method for producing the molded article of expanded beads is preferably an in-mold molding method for obtaining an in-mold molded article by in-mold molding of polyamide-based resin expanded beads. In particular, according to the in-mold molding method using steam, the polyamide-based resin constituting the polyamide-based resin expanded beads is plasticized by water absorption, so that the molding steam pressure can be reduced. When the obtained molded article of expanded beads is dried, the original physical properties of the polyamide-based resin are restored, so that the molded article of polyamide-based resin expanded beads becomes a molded article of expanded beads having high heat resistance.

The molded article of expanded beads has high heat resistance, is also excellent in abrasion resistance and chemical resistance and the like, and is also excellent in molded product fuse-bond characteristics. For this reason, the molded article of expanded beads is suitable as members of automobile components or electronic products or the like.

A molded article of expanded beads obtained by in-mold molding of expanded beads having a small coefficient of variation of an amount of heat of fusion of a high-temperature peak is excellent in initial elasticity during compression. Specifically, a value obtained by dividing 5% compressive stress by 50% compressive stress when a molded article of expanded beads is measured in a compression mode using a compression testing machine [(5% compressive stress)/(50% compressive stress)] is excellent. Here, the fact that the value is excellent means that the value is larger. The 5% compressive stress of the molded article of expanded beads represents the initial difficulty in crushing and bending of the molded article of expanded beads. The 5% compressive stress of the molded article of expanded beads is likely to be smaller as the coefficient of variation of the amount of heat of fusion of the high-temperature peak is larger. However, the 5% compressive stress of the molded article of expanded beads is also greatly affected by an expansion ratio and the magnitude of the amount of heat of fusion of the high-temperature peak. For this reason, only the 5% compressive stress makes it difficult to compare the molded articles of expanded beads with each other. By dividing the 5% compressive stress of the molded article of expanded beads by the 50% compressive stress, the influence of the expansion ratio and the magnitude of the amount of heat of fusion of the high-temperature peak is reduced to a negligible extent. This makes it possible to evaluate the magnitude of the compressive stress with respect to the compressive strain of the molded article of expanded beads caused by the coefficient of variation of the amount of heat of fusion of the high-temperature peak. That is, a molded article of expanded beads having an excellent value obtained by dividing 5% compressive stress by 50% compressive stress [(5% compressive stress)/(50% compressive stress)] is excellent in initial energy absorption efficiency during compression. The molded article of expanded beads excellent in initial elasticity during compression can be suitably used for a shock absorber such as an automobile bumper. In the measurement of the compressive stress, the molded article of expanded beads, which is placed in an environment at a temperature of 60° C. for 24 hours, then slowly cooled to room temperature (23° C.), and allowed to stand in a thermostatic chamber at a temperature of 23° C. and a relative humidity of 50% for 24 hours or more, is used as a sample.

EXAMPLES

Hereinafter, the present invention will be described in detail with reference to Examples, but the present invention is not limited thereto. Table 1 shows the details of resins used in the production of Examples and Comparative Examples. Production conditions and the like related to the production of polyamide-based resin expanded beads of each of Examples and Comparative Examples are shown in Table 2 as appropriate. The physical properties and evaluation results of the resin expanded beads of each of Examples and Comparative Examples and molded articles of expanded beads produced using the resin expanded beads are shown in Table 3. Table 3 also shows a molding steam pressure when the molded article of expanded beads of each of Examples and Comparative Examples is produced.

Example 1

[Production of Pellet-Shaped Polyamide-Based Resin Beads]

A polyamide-based resin shown in Table 1 was supplied to an extruder, and 0.8 parts by mass of "Talcan Powder PK-S" (manufactured by Hayashi Kasei Co., Ltd.) as a cell controlling agent was added to 100 parts by mass of the polyamide-based resin, and 1 part by mass of a carbodiimide compound ("Stabaxol P" manufactured by Rhein Chemie Corp.) as a terminal blocking agent was added to 100 parts by mass of the polyamide-based resin, followed by melt-kneading to obtain a melt-kneaded product. The melt-kneaded product was extruded into a strand shape having a circular cross section from pores of a mouthpiece attached to the tip of the extruder. The extruded strand-shaped melt-kneaded product was cooled with water, then cut with a pelletizer so that polyamide-based resin beads had an average mass of 2 mg, and dried to obtain the pellet-shaped polyamide-based resin beads.

[Production of Polyamide-Based Resin Expanded Beads]

50 kg of the polyamide-based resin beads obtained as described above and 2200 liters of water as a dispersion medium were charged into a 3000 liter autoclave equipped with a stirrer. Furthermore, 3.0 parts by mass of kaolin as a dispersant and 0.08 parts by mass of sodium alkylbenzene sulfonate as a dispersion aid were added to the dispersion medium with respect to 100 parts by mass of the polyamide-based resin beads. The temperature raise was started from room temperature (23° C.) while the contents in the autoclave were stirred, and carbon dioxide as an expanding agent was injected into the autoclave before (about 131° C.) the temperature reached a crystallization treatment temperature (holding temperature: 136.5° C.). The carbon dioxide was injected until the pressure in the autoclave reached 4.0 MPa (G). The temperature raising time from room temperature (23° C.) to reaching the crystallization treatment temperature was 30 minutes. The temperature raising rate was defined as an average rate obtained by dividing a value obtained by subtracting room temperature (23° C.) from the crystallization treatment temperature by the temperature raising time. After the temperature was further raised and the holding temperature reached 136.5° C., the environment in the autoclave was held at a temperature of 136.5° C. for a holding time (temperature holding) of 5 minutes while carbon dioxide was injected so that the pressure in the autoclave was held at 4.0 MPa (G). As a result, a high-temperature peak was formed, and the polyamide-based resin beads were sufficiently impregnated with the carbon dioxide. Thereafter, a lower valve of a pressure-resistant container was opened to release the polyamide-based resin beads impregnated with the expanding agent together with the dispersion liquid under an atmospheric pressure (about 0.1 MPa (absolute pressure)). The time from the start of the release to the completion was about 30 minutes, and the temperature in the pressure-resistant container was continuously raised at 0.6° C. per 10 minutes from the start of the release (start of expanding) to the completion (end of expanding). Therefore, the expanding start temperature was 136.5° C., and the expanding end temperature was 138.3° C. The obtained polyamide-based resin expanded beads were placed in an oven at 60° C. for 24 hours, and then slowly cooled to normal temperature (23° C.) to obtain polyamide-based resin expanded beads.

[Production of Molded Article of Polyamide-Based Resin Expanded Beads]

Next, the polyamide-based resin expanded beads obtained as described above was subjected to condition adjustment by leaving the beads to stand in an environment at a temperature of 23° C. and a relative humidity of 50% for 24 hours, and a molded article of polyamide-based resin expanded beads was then prepared using the polyamide-based resin expanded beads. As the polyamide-based resin expanded beads, a group of expanded beads obtained by uniformly mixing the expanded beads obtained in each of time zones T1 to T5 described in the measurement of the amount of heat of fusion of a high-temperature peak described later was used. The moisture content ratio of the polyamide-based resin expanded beads before molding, which was subjected to condition adjustment, was 3.5%. The moisture content ratio was measured by a method described later. First, polyamide-based resin expanded beads were filled in a flat mold having a length of 200 mm, a width of 250 mm, and a thickness of 50 mm and composed of a pair of opposing mold halves, and subjected to in-mold molding by steam heating to obtain a plate-shaped molded article of expanded beads. In the heating method, steam was supplied for 5 seconds in a state where drain valves of both mold halves were opened, to perform pre-heating (exhaust step). Thereafter, one side heating was performed at a pressure lower by 0.08 MPa (G) than a molding steam pressure shown in Table 3, and the other side heating was performed from the opposite direction at a pressure lower by 0.04 MPa (G) than the molding steam pressure shown in Table 3. Thereafter, main heating was performed from both sides at the molding steam pressure shown in Table 3.

After the heating was completed, the pressure was released, and after water cooling until a surface pressure due to the expanding force of the molded article decreased to 0.02 MPa (gauge pressure), the mold was opened, and the molded article was taken out from the mold. The obtained molded article was cured in an oven at 80° C. for 12 hours, then slowly cooled to room temperature (23° C.), and allowed to stand in an environment at a temperature of 23° C. and a relative humidity of 50% for 24 hours to perform the condition adjustment. In this way, a molded article of polyamide-based resin expanded beads was obtained. The moisture content ratio of the molded article of polyamide-based resin expanded beads after the condition adjustment was 3.5%. The moisture content ratio was measured by a method described later.

Examples 2 to 4

In Examples 2 to 4, polyamide-based resin expanded beads were produced in the same manner as in Example 1 except that the conditions were changed to those shown in Table 2, and molded articles of polyamide-based resin expanded beads were produced using the polyamide-based resin expanded beads.

In Example 3, an epoxy compound ("ARUFON UG4035" manufactured by Toagosei Co., Ltd.) was used as a modifier.

Comparative Example 1

In Comparative Example 1, polyamide-based resin expanded beads was produced in the same manner as in Example 1 except that the conditions were changed to those shown in Table 2, and a molded article of polyamide-based resin expanded beads were produced using the polyamide-based resin expanded beads. In Comparative Example 1, the temperature was not raised during an expanding step.

The various physical properties of the polyamide-based resin expanded beads and the molded article of polyamide-based resin expanded beads of each of Examples and Comparative Examples obtained as described above were measured and evaluated as follows. The measurement results and the evaluation results are shown in Tables 1 to 3.

[Evaluation of Polyamide-Based Resin Beads]

<Melting Point (° C.)>

By heat-flux differential scanning calorimetry based on JIS K7121-1987, the melting point of polyamide-based resin was measured. The polyamide-based resin was heated and melted from 30° C. to a temperature higher by 30° C. than that at the end of a melting peak at a heating rate of 10° C./min under the condition of a nitrogen inflow of 30 mL/min (first temperature rise). Then, the polyamide-based resin was kept at this temperature for 10 minutes, then cooled to 30° C. at a cooling rate of 10° C./min, and heated again at a heating rate of 10° C./min to a temperature higher by 30° C. than that at the end of the melting peak. The peak top temperature of the melting peak of the second DSC curve thus obtained was determined as the melting point of the polyamide-based resin. As the measuring apparatus, a high-sensitive differential scanning calorimeter "EXSTAR DSC7020" (manufactured by SII NanoTechnology Inc.) was used. For the measurement of the melting point, polyamide-based resin beads left to stand for 24 hours in an environment at a temperature of 23° C. and a relative humidity of 50% were used.

<Density (g/cm³)>

The density of the polyamide-based resin shown in Table 1 is a catalog value determined based on the method described in ISO 1183-3.

<Flexural Modulus (MPa)>

The flexural modulus of the polyamide-based resin was determined by the measurement in accordance with JIS K7171: 2016. In order to determine the flexural modulus, the polyamide-based resin was heat-pressed into a sheet, and then a resin test piece having a thickness of 4 mm, a width of 10 mm, and a length of 80 mm was prepared. The resin test piece was allowed to stand at a room temperature of 23° C. and a relative humidity of 50% for 72 hours. Thereafter, using the resin test piece, the measurement was performed with an Autograph AGS-10kNG (manufactured by Shimadzu Corporation) tester under the conditions of a distance between fulcrums of 64 mm, an indenter radius R of 15.0 mm, a support table radius R of 25.0 mm, a test rate of 2 mm/min, a room temperature of 23° C., and a relative humidity of 50%. The average value of values (5 points) calculated by the measurement was adopted as the flexural modulus. The flexural modulus of an amide-based elastomer (manufactured by Arkema, product name "PEBAX5533", melting point: 159° C., density: 1.01 g/cm$^3$) was measured based on the above method to be 150 MPa.

[Evaluation of Polyamide-Based Resin Expanded Beads]

<Amount of Heat of Fusion (J/g) of High-Temperature Peak>

In the expanding step of each of Examples and Comparative Examples, a period from an expanding step start time to an expanding step end time was divided into five equal parts to obtain five time zones (T1, T2, T3, T4, T5 in order from start). The polyamide-based resin expanded beads obtained in the time zones T1 to T5 were respectively taken as Samples 1 to 5. In Sample 1 to 5, 10 polyamide-based resin expanded beads were collected at an intermediate time in each time zone. The value of the amount of heat of fusion of the high-temperature peak of each of the 10 expanded beads in each time zone was measured as follows. The amounts of heat of fusion were arithmetically averaged for each time zone, and the arithmetic mean value was taken as the amount of heat of fusion for each time zone. The amounts of heat of fusion of all the expanded beads were arithmetically averaged, and the total average value $T_{av}$ of the amount of heat of fusion was calculated.

That is, on the basis of heat-flux differential scanning calorimetry of JIS K7122-1987, the polyamide-based resin expanded beads were used, and heated and melted at a heating rate of 10° C./min from 30° C. to a temperature higher by 30° C. than that at the end of the melting peak under the condition of a nitrogen inflow of 30 mL/min to obtain a DSC curve. For the measurement of the DSC curve, expanded beads subjected to the following condition adjustment were used. First, the obtained polyamide-based resin expanded beads were placed in an environment at a temperature of 60° C. for 24 hours, and then slowly cooled to room temperature (23° C.). Next, the polyamide-based resin expanded beads were allowed to stand for 24 hours in an environment at a temperature of 23° C. and a relative humidity of 50% to perform the condition adjustment. The amount of the expanded beads used in the DSC measurement was about 2 mg. As the measuring apparatus, a high-sensitive differential scanning calorimeter "EXSTAR DSC7020" (manufactured by SII NanoTechnology Inc.) was used.

In the obtained DSC curve, as in FIG. 1, the area of a high-temperature peak b in which the peak top temperature appeared on a higher temperature side than the peak top temperature of an intrinsic peak a was determined and taken as the amount of heat of fusion (endothermic energy) [J/g] of a high-temperature peak. Table 3 shows the peak top temperature of the intrinsic peak and the peak top temperature of the high-temperature peak b shown in the DSC curve.

<Semi-Crystallization Time>

The polyamide-based resin expanded beads were heat-pressed (press temperature: 230° C.) to prepare a film-shaped sample. The thickness of the film-shaped sample was 0.1±0.02 mm, and the shape of sample was set to a quadrangular shape of 15×15 mm. This sample, sandwiched between cover glasses for microscope, was used as measurement samples. A semi-crystallization time was determined as follows. First, the cover glasses holding the film-shaped sample were placed in an air bath of a crystallization rate measuring instrument (MK-801 manufactured by Kotaki Seisakusho), and the sample is completely melted to obtain a melted sample. The support with the melted sample was then placed between orthogonal polarizers in an oil bath held at (melting point-20° C.) Transmitted light due to an optically anisotropic crystal component increasing with the crystallization of the sample was measured, and the semi-crystallization time was calculated from a time at which the degree of crystallinity reached ½ using the following Avrami equation (the following formula (5)). The transmitted light was measured by a depolarized light intensity (depolarization) method).

[Expression 5]

$$1 - Xc = \mathrm{Exp}(-kt^n) \tag{5}$$
$$= (It - Ig)/(I0 - Ig)$$

(Xc: DEGREE OF CRYSTALLINITY, k: CRYSTALLIZATION RATE CONSTANT, n: AVRAMI CONSTANT, t: TIME (SECONDS), I0: DEPOLARIZED LIGHT TRANSMISSION INTENSITY [STARTING POINT], It: DEPOLARIZED LIGHT TRANSMISSION INTENSITY [AFTER T SECONDS], Ig: DEPOLARIZED LIGHT TRANSMISSION INTENSITY [END POINT])

<Standard Deviation and Coefficient of Variation of Amount of Heat of Fusion of High-Temperature Peak>

Using the amounts of heat of fusion of the high-temperature peaks of the 50 samples obtained as described above, the standard deviation V was determined from the formula shown in the following formula (7). Using the obtained value of the standard deviation V, the coefficient of variation C was obtained using the following formula (6). The standard deviation and coefficient of variation obtained as described above are shown in Table 3.

[Expression 6]

COEFFICIENT OF VARIATION $C$ (%)=(STANDARD DEVIATION $V$ OF AMOUNT OF HEAT OF FUSION OF HIGH-TEMPERATURE PEAK/AVERAGE VALUE $T_{av}$ OF AMOUNT OF HEAT OF FUSION OF HIGH-TEMPERATURE PEAK)×100  (6)

[Expression 7]

STANDARD DEVIATION $V=(\Sigma(T_i-T_{av})^2/(n-1))^{1/2}$  (7)

In the above formula, $T_i$ represents the amount of heat of fusion of each of 50 expanded beads collected as samples, $T_{av}$ represents the average value of these amounts of heat of fusion, and n represents the number of the samples (50).

<Apparent Density (kg/m$^3$)>

The mass W1 of polyamide-based resin expanded beads having a bulk volume of about 500 cm$^3$ was measured. A measuring cylinder containing water at a temperature of 23° C. was prepared, and the polyamide-based resin expanded beads having a mass W1 measured as described above were immersed in the measuring cylinder using a wire mesh. In consideration of the volume of the wire mesh, the volume V1 [cm$^3$] of the polyamide-based resin expanded beads read from the amount of water level rise was measured. The mass W1 [g] of the polyamide-based resin expanded beads was divided by the volume V1 (W1/V1), and the unit was converted to [kg/m$^3$] to determine the apparent density of the expanded beads.

In the measurement of the apparent density, a group of expanded beads was used, which was mixed so that the expanded beads obtained in each of the time zones T1 to T5 described in the measurement of the amount of heat of fusion of the high-temperature peak were uniform. The group of expanded beads was used for measurement after the following condition adjustment was performed. The condition adjustment was performed by placing the group of expanded beads in an environment at a temperature of 60° C. for 24 hours, then slowly cooling the group of expanded beads to room temperature (23° C.), and leaving the group of expanded beads to stand in an environment at a temperature of 23° C. and a relative humidity of 50% for 24 hours.

<Closed Cell Ratio>

In accordance with a procedure C described in ASTM-D2856-70, a value of the true volume Vx of expanded beads (sum of the volume of resin constituting the expanded beads and the total volume of cells in a portion of closed cells in the expanded beads) was measured using an air-comparison pycnometer. For the measurement of the true volume Vx, an air-comparison pycnometer "930" manufactured by Beckman-Toshiba Ltd., was used. Next, the closed cell ratio was calculated by the following formula (8), and the arithmetic mean value of the five measurement results was obtained. This was shown in Table 3 as the closed cell ratio of the expanded beads.

[Expression 8]

$$\text{CLOSED CELL RATIO } (\%) = (Vx - W/\rho) \times 100/(Va - W/\rho) \quad (8)$$

Vx: TRUE VOLUME OF EXPANDED BEADS MEASURED BY THE ABOVE METHOD (cm$^3$)

Va: APPARENT VOLUME OF EXPANDED BEADS (cm$^3$)

W: MASS OF SAMPLE FOR MEASUREMENT OF EXPANDED BEADS (g)

$\rho$: DENSITY OF RESIN CONSTITUTING EXPANDED BEADS (g/cm$^3$)

For the measurement of the closed cell ratio, as with the measurement of the apparent density, the expanded beads obtained in each of the time zones T1 to T5 were mixed so as to be uniform, and the group of expanded beads subjected to condition adjustment in the same manner as described above was used.

<Moisture Content Ratio>

Polyamide-based resin expanded beads were weighed, and the polyamide-based resin beads or the polyamide-based resin expanded beads were then heated using a heating moisture vaporizer to vaporize internal moisture content. The moisture content ratio was measured by Karl Fischer titration (coulometric titration) using a Karl Fischer moisture analyzer.

For the measurement of the moisture content ratio, as with the measurement of the apparent density, the expanded beads obtained in each of the time zones T1 to T5 were mixed so as to be uniform, and the group of expanded beads subjected to condition adjustment in the same manner as described above was used. The moisture content ratio of the molded article of polyamide-based resin expanded beads was also measured in the same manner as described above. The moisture content ratio was measured only in Example 1.

[Evaluation of Molded Article of Polyamide-Based Resin Expanded Beads]

Each of the molded articles of expanded beads obtained as described above was evaluated as samples as follows.

<Recoverability>

The obtained molded article of expanded beads was evaluated as follows. The thicknesses of an end part (10 mm inside from the end) and a central part (portion equally dividing in the longitudinal direction and in the cross direction) of the molded article of expanded beads corresponding to the dimensions of the mold in a plate shape used in the in-mold molding were measured. Next, the thickness ratio of the molded article of expanded beads ((the thickness of the central part of the molded article)/(the thickness of the end part of the molded article)×100(%)) was calculated for evaluation as follows.

A: Thickness ratio is 95% or more.

B: Thickness ratio is 90% or more and less than 95%.

C: Thickness ratio is less than 90%.

<Evaluation of Secondary Expandability>

The obtained molded article of expanded beads was evaluated as follows.

A: The gap between expanded beads in the molded article of expanded beads and at the surface of the molded article of expanded beads was completely filled.

B: The gap between expanded beads in the molded article of expanded beads was completely filled, but the gap between expanded beads was slightly observed at the surface of the molded article of expanded beads.

C: The gap between expanded beads was observed both in the molded article of expanded beads and at the surface of the molded article of expanded beads.

<Fuse-Bond Characteristics>

In order to determine the fuse-bond characteristics of the molded article of polyamide-based resin expanded beads, the fuse-bond ratio of the molded article of expanded beads was measured and evaluated as follows. The fuse-bond ratio was determined based on the ratio of the number of expanded beads in which the material failure had occurred among the expanded beads exposed on a fracture surface when the molded article of expanded beads was fractured. Specifically, first, a test piece (100 mm length×100 mm width×thickness: thickness of the molded article of expanded beads) was cut out from the molded article of expanded beads, and a notch of about 5 mm was cut in the thickness direction of each test piece with a cutter knife. Then, the test piece was fractured from the notch. Next, the number (n) of expanded beads present on the fracture surface of the molded article of expanded beads and the number (b) of expanded beads in which the material failure had occurred were measured, and the fuse-bond ratio (%) was taken as the ratio (b/n) between (b) and (n) expressed as a percentage. From the determined fuse-bond ratio (%), the fuse-bond characteristics were evaluated as follows.

A: Fuse-bond ratio (%) was 80% or more.

B: Fuse-bond ratio (%) was 60% or more and less than 80%.

C: Fuse-bond ratio (%) was 40% or more and less than 60%.

<5% Compressive Stress/50% Compressive Stress>

In each of Examples and Comparative Examples, a molded article of expanded beads most excellent in the evaluation of the molded article of expanded beads was selected. A molded skin was removed such that all the surfaces of the molded article of expanded beads were cut surfaces, and, a sample in a rectangular parallelepiped form having a length of 50 mm, a width of 50 mm, and a thickness of 25 mm was cut out from the center of the molded article of expanded beads. This sample was allowed to stand in a thermostatic chamber at a temperature of 23° C. and a relative humidity of 50% for 24 hours, and then the compression characteristics (stress-strain curve) of the molded article of expanded beads were measured in accordance with JIS K6767: 1999. Using "Autograph AGS-X" (manufactured by Shimadzu Corporation) as a measuring apparatus, the sample was compressed at a compression rate of 10 mm/min to calculate compression stresses at the time of 5% and 50% strains. The above operation was performed on five test pieces, and the arithmetic mean values of the values of the five test pieces were respectively taken as 5% compressive stress and 50% compressive stress. The 5% compressive stress value obtained as described above was divided by the 50% compressive stress value to calculate a ratio of 5% compressive stress/50% compressive stress.

TABLE 1

| ABBREVIATION | RESIN COMPOSITION | MELTING POINT (° C.) | DENSITY (g/cm$^3$) | FLEXURAL MODULUS (MPa) | MANUFACTURER | PRODUCT NAME |
|---|---|---|---|---|---|---|
| 1030B | POLYAMIDE 6 (NYLON 6) | 220 | 1.14 | 1770 | UBE INDUSTRIES, LTD. | UBE NYLON 1030B |
| 5033B | POLYAMIDE 6/66 COPOLYMER (NYLON 6/66) POLYAMIDE 6/POLYAMIDE 66-85/15 | 197 | 1.14 | 1260 | UBE INDUSTRIES, LTD. | UBE NYLON 5033B |

TABLE 2

| | | | EXAMPLE 1 | EXAMPLE 2 | EXAMPLE 3 | EXAMPLE 4 | EXAMPLE 5 |
|---|---|---|---|---|---|---|---|
| FORMULATION | RESIN | | 5033B | 1030B | 5033B | 5033B | 5033B |
| | MODIFIER | — | Stabaxol P | Stabaxol P | ARUFON UG4035 | — | Stabaxol P |
| | ADDITION AMOUNT OF MODIFIER | PART BY MASS | 1.0 | 1.0 | 1.0 | 0 | 1.0 |
| EXPANDING CONDITIONS | TIME REQUIRED FROM ROOM TEMPERATURE TO HOLDING TEMPERATURE | MINUTES | 30 | 45 | 30 | 30 | 30 |
| | HOLDING TEMPERATURE | ° C. | 136.5 | 157.7 | 136.5 | 136.5 | 137.4 |
| | TEMPERATURE HOLDING | MINUTES | 5 | 5 | 5 | 5 | 5 |
| | EXPANDING START TEMPERATURE | ° C. | 136.5 | 157.7 | 136.5 | 136.5 | 137.4 |
| | EXPANDING TIME | MINUTES | 30 | 30 | 30 | 30 | 30 |
| | TEMPERATURE RAISING RATE DURING EXPANDING | ° C./10 MINUTES | 0.6 | 0.4 | 0.6 | 0.5 | 0 |
| | EXPANDING END TEMPERATURE | ° C. | 138.3 | 158.9 | 138.3 | 138.3 | 137.4 |

TABLE 3

| | | EXAMPLE 1 | EXAMPLE 2 | EXAMPLE 3 | EXAMPLE 4 | COMPARATIVE EXAMPLE 1 |
|---|---|---|---|---|---|---|
| RESIN EXPANDED BEADS | | | | | | |
| AMOUNT OF HEAT OF FUSION OF HIGH-TEMPERATURE PEAK — AVERAGE VALUE OF SAMPLE 1 | J/g | 9.0 | 15.1 | 9.1 | 9.0 | 5.4 |
| AVERAGE VALUE OF SAMPLE 2 | J/g | 9.2 | 13.8 | 9.3 | 9.9 | 7.9 |
| AVERAGE VALUE OF SAMPLE 3 | J/g | 9.6 | 14.5 | 9.7 | 10.8 | 10.0 |
| AVERAGE VALUE OF SAMPLE 4 | J/g | 9.5 | 14.0 | 10.0 | 10.1 | 11.3 |
| AVERAGE VALUE OF SAMPLE 5 | J/g | 10.0 | 13.3 | 10.6 | 11.5 | 12.1 |
| TOTAL AVERAGE VALUE (Tav) | J/g | 9.5 | 14.2 | 9.7 | 10.3 | 9.3 |
| STANDARD DEVIATION Y | J/g | 8.38 | 0.70 | 0.59 | 0.94 | 2.72 |
| COEFFICIENT OF VARIATION C | % | 4.1 | 5.0 | 6.1 | 9.2 | 29.1 |
| HIGH-TEMPERATURE PEAK — APEX TEMPERATURE OF HIGH-TEMPERATURE PEAK | °C | 210.7 | 230.1 | 210.7 | 210.6 | 210.7 |
| INTRINSIC PEAK — APEX TEMPERATURE OF INTRINSIC PEAK | °C | 191.2 | 217.8 | 191.0 | 191.1 | 191.0 |
| SEMI-CRYSTALLIZATION TIME | SECONDS | 540 | 310 | 250 | 410 | 530 |
| MOLDED ARTICLE OF EXPANDED BEADS | | | | | | |
| APPARENT DENSITY | kg/m³ | 104 | 90 | 106 | 106 | 108 |
| CLOSED CELL RATIO | % | 94 | 93 | 92 | 91 | 92 |
| MOLDING STEAM PRESSURE | MPa(G) | 0.18 / 0.20 / 0.22 | 0.34 / 0.46 / 0.48 | 0.18 / 0.20 / 0.22 | 0.18 / 0.20 / 0.22 | 0.18 / 0.20 / 0.22 |
| RECOVERABILITY | — | A / A / A | A / A / A | A / A / A | A / A / B | A / B / B |
| SECONDARY EXPANDABILITY | — | A / A / A | A / A / A | A / A / A | B / A / A | B / B / A |
| FUSE-BOND CHARACTERISTICS | — | A / A / A | A / A / A | A / A / A | B / A / A | C / A / A |
| (5% COMPRESSIVE STRESS)/(50% COMPRESSIVE STRESS) | — | 0.55 | 0.58 | 0.53 | 0.47 | 0.41 |

The above embodiment includes the following technical ideas.

(1) Polyamide-based resin expanded beads containing a polyamide-based resin as a base material resin, in which the polyamide-based resin expanded beads have a crystal structure in which a melting peak (intrinsic peak) intrinsic to the polyamide-based resin and a melting peak (high-temperature peak) having a peak top temperature on a higher temperature side than a peak top temperature of the intrinsic peak appear in a DSC curve obtained under the following condition 1, an amount of heat of fusion of the high-temperature peak is within a range of 5 J/g or more and 50 J/g or less and a coefficient of variation of the amount of heat of fusion of the high-temperature peak is 20% or less:

(Condition 1)

On the basis of heat-flux differential scanning calorimetry of JIS K7122-1987, the polyamide-based resin expanded beads are used as test pieces, and heated and melted at a heating rate of 10° C./min from 30° C. to a temperature higher by 30° C. than that at the end of the melting peak to obtain the DSC curve.

(2) The polyamide-based resin expanded beads according to the above (1), in which the polyamide-based resin is a modified polyamide-based resin modified with one or more compounds selected from a carbodiimide compound, an oxazoline compound, an isocyanate compound, and an epoxy compound.

(3) The polyamide-based resin expanded beads according to the above (1) or (2), in which the polyamide-based resin expanded beads have a closed cell ratio of 85% or more.

(4) A molded article of polyamide-based resin expanded beads obtained by in-mold molding of the polyamide-based resin expanded beads according to any one of the above (1) to (3).

(5) A method for producing the polyamide-based resin expanded beads according to any one of the above (1) to (3), the method including:

a dispersion step of dispersing polyamide-based resin beads in an aqueous dispersion medium in a sealed container;

an expanding agent applying step of adding an expanding agent to the polyamide-based resin beads;

a crystallization treatment step of heating the polyamide-based resin beads dispersed in the aqueous dispersion medium to form a high-temperature peak; and an expanding step of releasing the polyamide-based resin beads containing the expanding agent together with the aqueous dispersion medium from the sealed container under a pressure lower than a pressure in the sealed container to expand the polyamide-based resin beads, wherein in the expanding step, when the polyamide-based resin beads containing the expanding agent are released from the sealed container, a temperature rise adjustment that raises the temperature in the sealed container at a rate of 0.3° C. or higher and 1.5° C. or lower per 10 minutes is performed.

(6) The method for producing the polyamide-based resin expanded beads according to the above (5), in which the polyamide-based resin beads contain, as a base material resin, a modified polyamide-based resin modified with one or more compounds selected from a carbodiimide compound, an oxazoline compound, an isocyanate compound, and an epoxy compound.

(7) The method for producing the polyamide-based resin expanded beads according to the above (5) or (6), in which in the crystallization treatment step, a high-temperature peak is formed by holding the polyamide-based resin expanded beads for 1 minute or more and 60 minutes or less at a temperature that is equal to or higher than a temperature lower by 90° C. (Tm–90° C.) than an intrinsic melting point (Tm) of a polyamide-based resin and lower than a temperature lower by 50° C. (Tm–50° C.) than the intrinsic melting point (Tm).

REFERENCE SIGNS LIST a intrinsic peak
b high-temperature peak
I, II, III, IV point

The invention claimed is:

1. Polyamide-based resin expanded beads comprising a polyamide-based resin as a base material resin, wherein:

the polyamide-based resin is a modified polyamide-based resin modified with one or more compounds selected from a group consisting of a carbodiimide compound, and an epoxy compound in an amount of 0.5-3 parts by mass with respect to 100 parts by mass of the polyamide-based resin;

the polyamide-based resin expanded beads have a crystal structure in which a melting peak (intrinsic peak) intrinsic to the polyamide-based resin and a melting peak (high-temperature peak) having a peak top temperature on a higher temperature side than a peak top temperature of the intrinsic peak appear in a DSC curve obtained under the following condition 1;

an amount of heat of fusion of the high-temperature peak is within a range of 7 J/g or more and 20 J/g or less;

a coefficient of variation of the amount of the heat of fusion of the high-temperature peak is about 6% or less;

the polyamide-based resin expanded beads have a closed cell ratio of 85% or more; and a flexural modulus of the polyamide-based resin is 1000 MPa or more and about 3000 MPa or less:

(Condition 1)

on the basis of heat-flux differential scanning calorimetry of JIS K7122-1987, the polyamide-based resin expanded beads are used as test pieces, and heated and melted at a heating rate of 10° C./min from 30° C. to a temperature higher by 30° C. than that at the end of the melting peak to obtain the DSC curve.

2. The polyamide-based resin expanded beads according to claim 1, wherein the polyamide-based resin expanded beads have a closed cell ratio of 90% or more and 97% or less.

3. The polyamide-based resin expanded beads according to claim 1, wherein the polyamide-based resin expanded beads do not comprise a thermoplastic elastomer.

4. A molded article of polyamide-based resin expanded beads obtained by in-mold molding of the polyamide-based resin expanded beads according to claim 1.

5. A method for producing the polyamide-based resin expanded beads according to claim 1, the method comprising:

a dispersion step of dispersing polyamide-based resin beads comprising the modified polyamide-based resin in an aqueous dispersion medium in a sealed container;

an expanding agent applying step of adding an expanding agent to the polyamide-based resin beads;

a crystallization treatment step of heating the polyamide-based resin beads dispersed in the aqueous dispersion medium to form a high-temperature peak; and an expanding step of releasing the polyamide-based resin beads containing the expanding agent together with the aqueous dispersion medium from the sealed container under a pressure lower than a pressure in the sealed container to expand the polyamide-based resin beads, wherein in the expanding step, when the polyamide-based resin beads containing the expanding agent are released from the sealed container, a temperature rise adjustment that raises the temperature in the sealed container at a rate of 0.3° C. or higher and 1.5° C. or lower per 10 minutes is performed.

6. The method for producing the polyamide-based resin expanded beads according to claim 5, wherein in the crystallization treatment step, the high-temperature peak is formed by holding the polyamide-based resin expanded beads for 1 minute or more and 60 minutes or less at a temperature that is equal to or higher than a temperature lower by 90° C. (Tm−90° C.) than an intrinsic melting point (Tm) of the modified polyamide-based resin and lower than a temperature lower by 50° C. (Tm−50° C.) than the intrinsic melting point (Tm) of the modified polyamide-based resin.

* * * * *